US010552992B2

(12) United States Patent
Lin et al.

(10) Patent No.: US 10,552,992 B2
(45) Date of Patent: Feb. 4, 2020

(54) POLY-ENERGETIC RECONSTRUCTION METHOD FOR METAL ARTIFACTS REDUCTION

(71) Applicant: CARESTREAM HEALTH, INC., Rochester, NY (US)

(72) Inventors: Yuan Lin, Rochester, NY (US); William J. Sehnert, Fairport, NY (US)

(73) Assignee: Carestream Health, Inc., Rochester, NY (US)

(*) Notice: Subject to any disclaimer, the term of this patent is extended or adjusted under 35 U.S.C. 154(b) by 131 days.

(21) Appl. No.: 15/964,835

(22) Filed: Apr. 27, 2018

(65) Prior Publication Data
US 2018/0336708 A1 Nov. 22, 2018

Related U.S. Application Data

(60) Provisional application No. 62/507,285, filed on May 17, 2017.

(51) Int. Cl.
*G06T 11/00* (2006.01)
*G06T 15/06* (2011.01)
*G06T 15/08* (2011.01)

(52) U.S. Cl.
CPC .......... *G06T 11/005* (2013.01); *G06T 11/006* (2013.01); *G06T 15/06* (2013.01);
(Continued)

(58) Field of Classification Search
CPC ..... G06T 11/006; G06T 11/005; G06T 15/08; G06T 2211/424; G06T 15/06;
(Continued)

(56) References Cited

U.S. PATENT DOCUMENTS 5,270,926 A    12/1993  Tam
5,999,587 A    12/1999  Ning et al.
(Continued)

FOREIGN PATENT DOCUMENTS

WO    2016/003957    1/2016

OTHER PUBLICATIONS

Matthias Zwicker et al., "EWA Volume Splatting" (2001), IEEE Computer Society, Proceedings of the conference on Visualization'01, pp. 29-37. (Year: 2001).*
(Continued)

*Primary Examiner* — Diane D Mizrahi

(57) ABSTRACT

A method for reducing metal artifacts in a volume radiographic image acquires a first set of projection images of an object on a radiographic detector at different acquisition angles. An initial estimate of the volume that includes the object using the acquired projection images is generated. The estimated volume is updated by one or more iterations of generating a second set of scatter-corrected projection images using the acquired first set of projection images and the estimated volume; generating a third set of estimated projection images using forward ray-tracing through the estimated volume; and reconstructing the estimated volume according to a signal quality factor obtained from analysis of the detector signal and used in a comparison of the second set of scatter-corrected projection images with the third set of estimated projection images. One or more images rendered from the updated estimated volume are displayed.

12 Claims, 7 Drawing Sheets

(52) U.S. Cl.
CPC ........ *G06T 15/08* (2013.01); *G06T 2211/408* (2013.01); *G06T 2211/421* (2013.01); *G06T 2211/424* (2013.01)

(58) Field of Classification Search
CPC ......... G06T 2211/421; G06T 2211/408; G06T 2211/436; G06T 11/008
See application file for complete search history.

(56) References Cited

U.S. PATENT DOCUMENTS

| | | | | |
|---|---|---|---|---|
| 8,989,469 | B2* | 3/2015 | Fahimian | A61B 6/032 378/19 |
| 2008/0095302 | A1 | 4/2008 | Ruhrnschopf et al. | |
| 2010/0054394 | A1* | 3/2010 | Thibault | G06T 11/006 378/8 |
| 2013/0004042 | A1* | 1/2013 | Yang | G06T 11/005 382/131 |
| 2013/0156163 | A1* | 6/2013 | Liu | A61B 6/482 378/207 |
| 2015/0213633 | A1* | 7/2015 | Chang | G01N 23/046 382/284 |
| 2016/0100814 | A1* | 4/2016 | Schildkraut | A61B 6/032 382/131 |
| 2016/0213345 | A1* | 7/2016 | Star-Lack | A61B 6/032 |
| 2016/0314584 | A1* | 10/2016 | Hennix | A61B 6/032 |
| 2018/0113227 | A1* | 4/2018 | Lin | G01T 7/005 |
| 2018/0325485 | A1* | 11/2018 | Maslowski | G06T 7/0012 |

OTHER PUBLICATIONS

Kilian Dremel et al., "Scatter simulation and correction in computed tomography: A reconstruction-integrated approach modeling the forward projection," NDT & E International, Dec. 2016, vol. 86, No. 14, pp. 132-139.

Daxin Shu et al., "Weighted Simultaneous Algebraic Reconstruction Technique," 11$^{th}$ International Meeting on Fully 3D Image Reconstruction in Radiology and Nuclear Medicine, Jul. 2011, pp. 160-162.

European Search Report dated Oct. 2, 2018 for European Patent Application No. 18 172 640.7, 1 page.

Idris A. Elbakri and Jeffrey A. Fessler, "Statistical Image Reconstruction for Polyenergetic X-ray Computed Tomography," IEEE Trans. Medical Imaging 21(2), Feb. 2002, pp. 1-15.

Yuan Lin and Ehsan Samei, "A fast poly-energetic iterative algorithm," Physics in Medicine and Biology 59, 2014, pp. 1655-1678.

Yuan Lin and Ehsan Samei, "An efficient polyenergetic SART (pSART) reconstruction algorithm for quantitative myocardial CT perfusion," Medical Physics, 41(2), Feb. 2014, pp. 021911-1-021911-14.

F. Edward Boas and Dominik Fleischmann, "CT artifacts: Causes and reduction techniques," Imaging Med. (2012), 4(2), pp. 229-240.

* cited by examiner

POLY-ENERGETIC RECONSTRUCTION METHOD FOR METAL ARTIFACTS REDUCTION

This application claims the benefit of U.S. Provisional application U.S. Ser. No. 62/507,285 provisionally filed on May 17, 2017, entitled "POLY-ENERGETIC RECONSTRUCTION METHOD FOR METAL ARTIFACTS REDUCTION", in the names of Yuan Lin and William J. Sehnert, incorporated herein in its entirety.

TECHNICAL FIELD

The disclosure relates generally to the field of medical imaging for systems such as radiography, tomosynthesis, computed tomography (CT), low-cost CT, and cone-beam CT (CBCT). In particular, the disclosure is directed to methods for efficiently reducing metal artifacts in the reconstructed image from the CBCT scanner.

BACKGROUND

CT and CBCT imaging are established techniques for medical diagnosis assistance. Compared with other imaging techniques, such as magnetic resonance imaging (MRI), CT has various advantages, such as lower cost, shorter acquisition time, and higher resolution, and can be safer for patients with metal implants, such as patients with total knee replacement (TKR) or total elbow replacement (TER) or for clinical operations involving metal devices (such as CT guided biopsy procedures).

SUMMARY

It is an object of the present disclosure to advance the art of volume imaging and provide improved ways to reduce metal artifacts in CBCT volume images. Processing is provided in both the volume and projection domains, providing improved results over other artifact-reduction methods.

Embodiments of the present disclosure provide automated methods that help to reduce streaking and other effects in the volume image that can result from metal artifacts. Information on underlying tissues in the volume image is retained following artifact reduction processing.

These objects are given only by way of illustrative example, and such objects may be exemplary of one or more embodiments of the disclosure. Other desirable objectives and advantages inherently achieved by the disclosed disclosure may occur or become apparent to those skilled in the art. The disclosure is defined by the appended claims.

According to one aspect of the disclosure, there is provided a method for reducing metal artifacts in a volume radiographic image, the method executed at least in part on a computer and comprising: acquiring a first set having a plurality of projection images of an object captured on a radiographic detector at different acquisition angles; generating an estimate of the volume that includes the object using the acquired projection images; updating the estimated volume by executing one or more iterations of: (i) generating a second set of scatter-corrected projection images using the acquired first set of projection images and a scatter distribution calculated for the estimated volume; (ii) generating a third set of estimated projection images using forward ray-tracing through the estimated volume; (iii) reconstructing the estimated volume according to a signal quality factor obtained from analysis of the detector signal and used in a comparison of the second set of scatter-corrected projection images with the third set of estimated projection images and; displaying one or more images rendered from the updated estimated volume.

BRIEF DESCRIPTION OF THE DRAWINGS

The foregoing and other objects, features, and advantages of the disclosure will be apparent from the following more particular description of the embodiments of the disclosure, as illustrated in the accompanying drawings. The elements of the drawings are not necessarily to scale relative to each other.

DETAILED DESCRIPTION OF THE EMBODIMENTS

Figure 1:
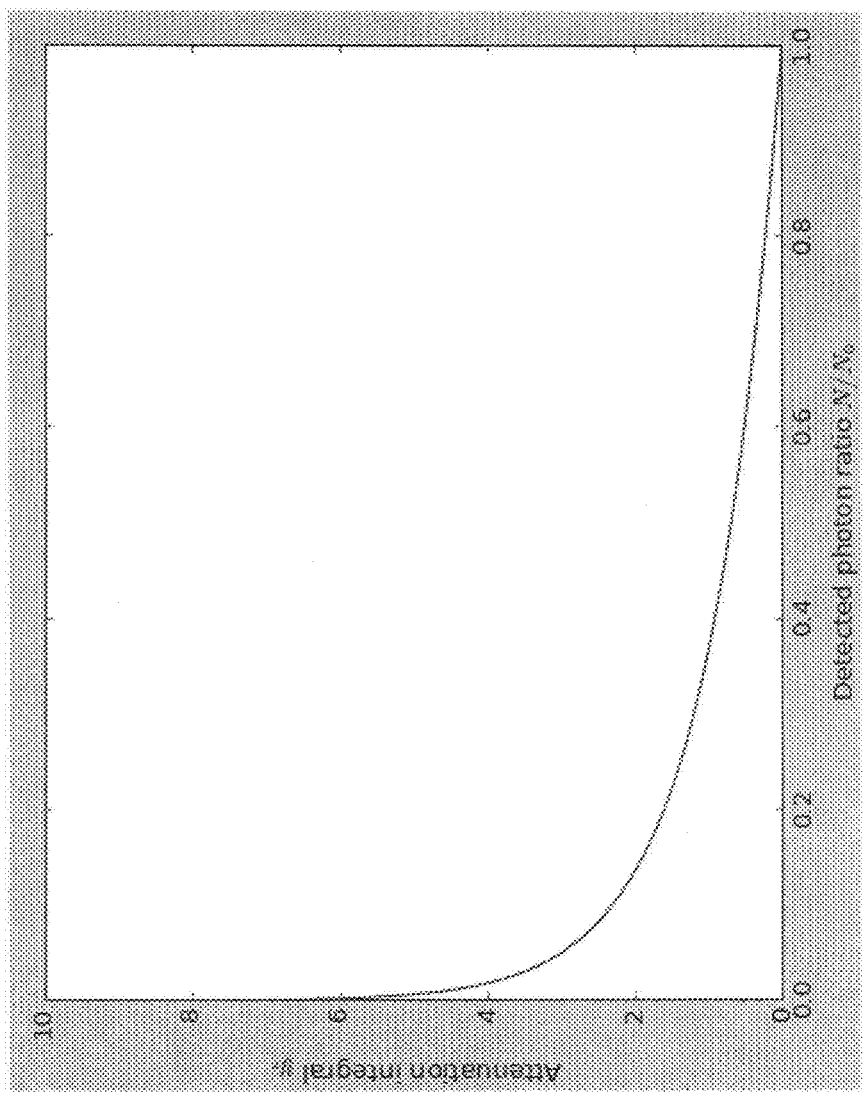
FIG. 1 is a graph that shows a typical attenuation response for a material.

The following is a detailed description of preferred embodiments of the disclosure, reference being made to the drawings in which the same reference numerals identify the same elements of structure in each of the several figures.

In the drawings and text, like components are designated with like reference numerals, and similar descriptions concerning components and arrangement or interaction of components already described are omitted. Where they are used in the present Specification and in the Claims, the terms "first", "second", and so on, do not necessarily denote any ordinal or priority relation, but are simply used to more clearly distinguish one element from another.

In the context of the present disclosure, the term "volume image" is synonymous with the terms "3-dimensional image" or "3-D image".

Embodiments of the present disclosure are suitable for suppressing the types of metal artifacts that occur in 3-D volume images, including cone-beam computed tomography (CBCT) as well as fan-beam CT images.

For the image processing steps described herein, the terms "pixels" for picture image data elements, conventionally used with respect 2-D imaging and image display, and "voxels" for volume image data elements, often used with respect to 3-D imaging, can be used interchangeably. It is noted that the 3-D volume image is itself synthesized from image data obtained as pixels on a 2-D sensor array and displays as a 2-D image from some angle of view. Thus, 2-D image processing and image analysis techniques can be applied to the 3-D volume image data. In the description that follows, techniques described as operating upon pixels may alternately be described as operating upon the 3-D voxel data that is stored and represented in the form of 2-D pixel data for display. In the same way, techniques that operate upon voxel data can also be described as operating upon pixels.

In the context of the present disclosure, the noun "projection" may be used to mean "projection image", referring to the 2-D image that is captured or generated and used to reconstruct the volume image. In addition, "projection" can also refer to calculated projections for a simulated cone beam system that are obtained by calculating the attenuation of X-rays as they propagate through a reconstructed 3-D image volume.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. A "proper subset" of set S is strictly contained in set S and excludes at least one member of set S. Cardinality of a set refers to the number of elements in the set.

CT and CBCT systems capture volume data sets by using a high frame rate flat panel digital radiography (DR) detector and an x-ray source, typically affixed to a gantry that revolves about the subject to be imaged. The CT system directs, from various points along its orbit around the subject, a divergent cone beam of x-rays through the subject and to the detector. The CBCT system captures projection images throughout the source-detector orbit, for example, with one 2-D projection image at every degree increment of rotation. The projections are then reconstructed into a 3-D volume image using various techniques. Among the most common methods for reconstructing the 3-D volume image from 2-D projections are filtered back projection (FBP) and Feldkamp-Davis-Kress (FDK) approaches.

Although 3-D images of diagnostic quality can be generated using CBCT systems and technology, a number of technical challenges remain. Highly dense objects, such as metallic implants, appliances, surgical clips and staples, dental fillings, and the like can cause various image artifacts that can obscure useful information about the imaged tissue, degrading the image quality of the reconstructed images and making it difficult for doctors to interpret.

There can be various causes for metal artifacts, including:

(i) Non-linear energy dependency: The attenuation of metals is highly nonlinear by comparison with soft tissue having high water content. Due to this disparity in attenuation response, it is desirable for realistic reconstruction to incorporate attenuation factors specific to metal features as prior information.

(ii) Low detector signal and low reliability: The detector signal ratio and the attenuation integral $y_r$ along the r-th ray path has the following approximated form, $$y_r \approx -\ln\left(\frac{N_r}{N_0}\right).$$

As the attenuation of metals is much higher than that of soft tissue, the detector signal ratios through metal are comparatively very low. With very low detector signal ratios, small variation in value can induce large variation in the attenuation integrals. This effect, graphically shown in FIG. 1, can result in low signal reliability. This low signal reliability problem can be further compounded by consideration of factors such as scatter, quantum noise, and electronic noise from the detector itself.

(iii) Photon starvation: Where metal features are particularly thick, almost all incident photons can be absorbed, with no photons traversing to the detector. After subtracting scatter from the detector signal, the reference primary signal would be zero, yielding an unrealistic infinite attenuation linear integral. This can have a pronounced effect on reconstruction calculations, causing significant artifacts.

(iv) Unrestricted error propagation: The following equation is a general form of the iterative reconstruction equation.

$$\mu_v^{k+1} \mu_v^k + f(y_r - y_{0r})$$

To derive the next iterative attenuation value, $\mu_v^{k+1}$, the attenuation of the v-th voxel at the k-th iteration ($\mu_v^k$) is updated using function $f(x)$, the argument value, which is usually proportional to the difference of the estimated attenuation integrals at the r-th ray path from the X-ray source to the detector ($y_r$) and the measured attenuation linear integrals ($y_{0r}$). When the detector signal ratio is small, the value of $y_r - y_{0r}$ can have significant error due to large variation at this range. This large error propagates to other voxels along the r-th X-ray path during the backward updating process in reconstruction. This effect creates so-called metal-induced streaking artifacts.

A number of approaches have been tried for metal artifacts reduction (MAR), with varying success and some shortcomings. Some of the current scatter reduction techniques are mono-energetic based and do not consider the poly-energetic X-ray spectrum and the non-linear energy dependency of the attenuations of different body tissues and metals. To reduce metal artifact effects, some techniques are limited to segmentation based strategies, i.e., segmenting the metal signals from the projections and replacing them with neighborhood values, such as using in-painting techniques. This strategy is relatively simple, but it ignores signals that pass through the metal features. This is particularly noticeable for portions of bone and other tissue partially bounded within curved metal plates. In some cases, the condition of this enclosed tissue is of particular interest to the practitioner, but the reconstructed image data is inaccurate or unavailable for diagnostic information due to metal artifacts.

Reducing artifacts that are caused by metal and other highly attenuating objects has value for a number of reasons, particularly for imaging related to implants of various types. Although some progress has been made to form volume image data that distinguishes features of different densities, there is still considerable room for improvement and a need for a method of metal artifacts reduction that offers improved performance and computational efficiency.

Dense objects having a high atomic number attenuate X-rays in the diagnostic energy range much more strongly than do soft tissue or bone features, so that far fewer photons reach the imaging detector through these objects. For 3-D imaging, the image artifacts that can be generated by metallic and other highly dense objects include dark and bright streaks that spread across the entire reconstructed image. Such artifacts can be due to physical effects such as high noise, radiation scatter, beam hardening, the exponential edge-gradient effect, aliasing, and clipping, and non-linear amplification in FBP or other reconstruction methods. The image degradation commonly takes the form of light and dark streaks in soft tissue and dark bands around and between highly attenuating objects. These image degradations are commonly referred to as artifacts because they are a result of the image reconstruction process and only exist in the image, not in the scanned object. These artifacts not only conceal the true content of the object, but can be mistaken for structures in the object. Artifacts of this type can reduce image quality by masking other structures, not only in the immediate vicinity of the dense object, but also throughout the entire image. At worst, this can falsify reconstructed CT values and even make it difficult or impossible to use the reconstructed image effectively in assessing patient condition or for planning suitable treatment.

Methods of the present disclosure present a poly-energetic reconstruction technique, which addresses some of the causes of the metal artifacts by incorporating weighting factors into the reconstruction model. This approach can help to provide a method for reducing artifacts in X-ray cone beam reconstructions that are caused by metal and other highly X-ray attenuating materials such as those used for implants that are placed within the body.

In the context of the present disclosure, high-density radio-opaque objects that cause what is commonly known as metal artifacts in the volume image are termed "metal" objects. This includes objects formed from materials having a relatively high attenuation coefficient. As shown in FIG. 1, the attenuation coefficient for a material is not a fixed value, but varies and is dependent, in part, on the photon energy level.

An exemplary metal object of titanium, for example, has an attenuation coefficient of about 0.8 $cm^{-1}$ in the 80 KeV range. Bone has a typical attenuation coefficient of about 0.6 $cm^{-1}$ in the 80 KeV range. An object having attenuation at or near that of titanium or higher can be considered to be a metal object. It is noted, for example, that objects formed from some types of highly dense composite materials can have a similar effect on image quality as objects formed from metal or alloys. The methods of the present disclosure address the type of artifact generated by such objects, of whatever material type or other composition.

Materials commonly used and known to cause at least some type of "metal artifact" in radiographs and volume images include metals such as iron, cobalt, chromium, titanium, tantalum, and alloys including cobalt chromium alloys, for example, as well as some ceramic compositions and various composite materials such as high density composite plastics. Examples of typical implants include various types of prostheses, pins, plates, screws, nails, rods, caps, crowns, bridges, fixtures, braces, dentures, fillings, etc. The implants are usually formed of metal and/or ceramic material.

CBCT imaging apparatus and the imaging algorithms used to obtain 3-D volume images using such systems are known in the diagnostic imaging art and are, therefore, not described in detail in the present application. Some exemplary algorithms and approaches for forming 3-D volume images from the source 2-D images, projection images that are obtained in operation of the CBCT imaging apparatus can be found, for example, in U.S. Pat. No. 5,999,587 entitled "METHOD OF AND SYSTEM FOR CONE-BEAM TOMOGRAPHY RECONSTRUCTION" (Ning), and U.S. Pat. No. 5,270,926 entitled "METHOD AND APPARATUS FOR RECONSTRUCTING A THREE-DIMENSIONAL COMPUTERIZED TOMOGRAPHY (CT) IMAGE OF AN OBJECT FROM INCOMPLETE CONE BEAM DATA" (Tam), both incorporated herein in their entirety.

In typical applications, a computer or other type of dedicated logic processor for obtaining, processing, and storing image data is part of the CBCT system, along with one or more displays for viewing image results. A computer-accessible memory is also provided, which may be a memory storage device used for longer term storage, such as a device using magnetic, optical, or other data storage media. In addition, the computer-accessible memory can comprise an electronic memory such as a random access memory (RAM) that is used for shorter term storage, such as employed to store a computer program having instructions for controlling one or more computers to practice the method according to methods of the present disclosure.

To more fully understand methods of the present disclosure and the problems addressed, it is instructive to review some principles and terminology used for CBCT image capture and reconstruction. Referring to the perspective view of FIG. 2, there is shown, in schematic form and using enlarged distances for clarity of description, the activity of a conventional CBCT imaging apparatus for capturing the individual 2-D projection images 36 that are used to form a 3-D volume image. A cone-beam radiation source 22 directs a cone of radiation toward a subject 20, such as a patient or other subject. A sequence of images is obtained in rapid succession at varying projection angles θ, alternately termed acquisition angles, about the subject, such as one image at each 1-degree angle increment in a 200-degree orbit. A DR detector 24 is moved to different imaging positions about subject 20 in concert with corresponding movement of radiation source 22. FIG. 1 shows a representative sampling of DR detector 24 positions to illustrate how these images are obtained relative to the position of subject 20. Once the needed 2-D projection images are captured in this sequence, a suitable imaging algorithm, such as filtered back projection (FBP) or other conventional technique, is used for generating the 3-D volume image. Image acquisition and program execution are performed by a computer 30 or by a networked group of computers 30 that are in image data communication with DR detectors 24. Image processing and storage is performed using a computer-accessible memory 32. The 3-D volume image can be presented on a display 34.

FBP is a discrete implementation of an analytic model that assumes that CT transmission measurements are linear functions of the attenuation line integrals along the corresponding primary photon trajectories through the subject and are noiseless. When scanning subjects that comprise anatomically native materials under normal conditions, relatively simple corrections to the raw projection data are sufficient to assure that these assumptions (i.e. linear relationship) are at least approximately true. This treatment allows FBP images that are relatively free of visually observable artifacts. This situation is altered, however, when foreign materials are introduced. In regions shadowed by highly dense, attenuating objects such as metal, there is typically a dramatic increase in noise and nonlinear detector response due to scatter, beam hardening, and photon starvation. This gives rise to pronounced streaking artifacts. Mismatches between the simplified FBP model of detector response and the physical process of signal acquisition when metal objects are in the scanning field of view are the main source of those metal artifacts. An accurate physical model of the CT signal acquisition process is useful to mitigate the metal artifacts based on FBP reconstruction.

Figure 3:
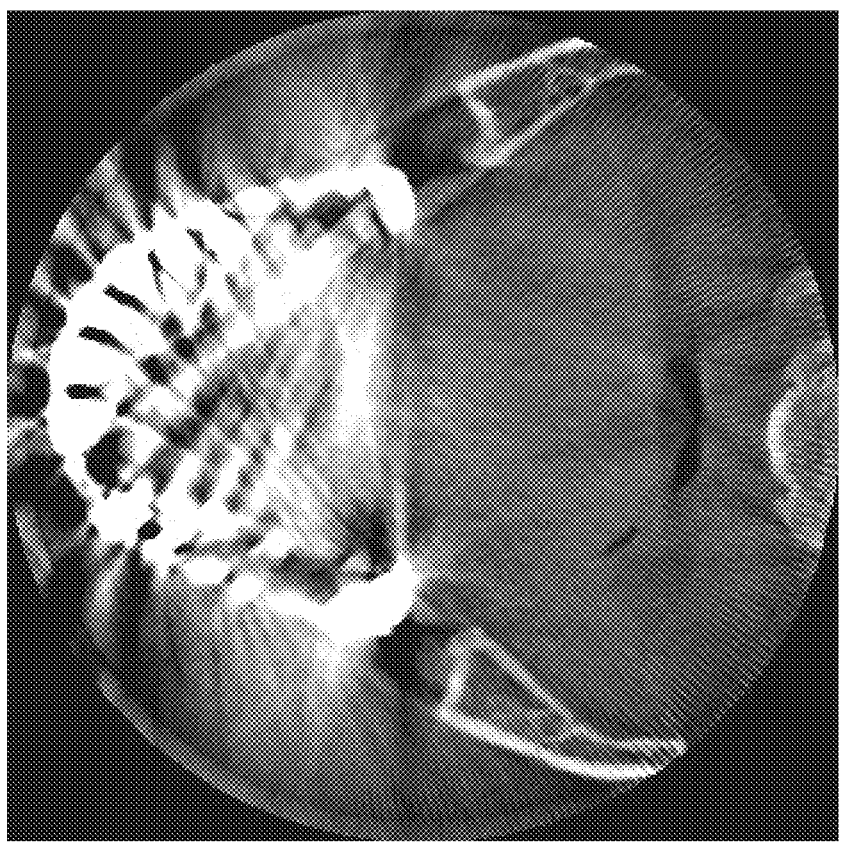
FIG. 3 shows an example of a metal artifact.

FIG. 3 shows an example image slice from a reconstructed dental image volume that exhibits metal artifacts. Highly dense restoration components of metal or other materials can cause the characteristic streaking and excessively dark regions that appear in such images.

Embodiments of the present disclosure reduce metal artifacts using an iterative process that combines poly-energetic forward ray tracing and a projection data weighting logic. Continually improved estimates of the actual acquired projection images are generated, reducing artifact effects and more accurately showing features of the anatomy that might otherwise be obscured due to neighboring, highly dense metal features.

Figure 4:
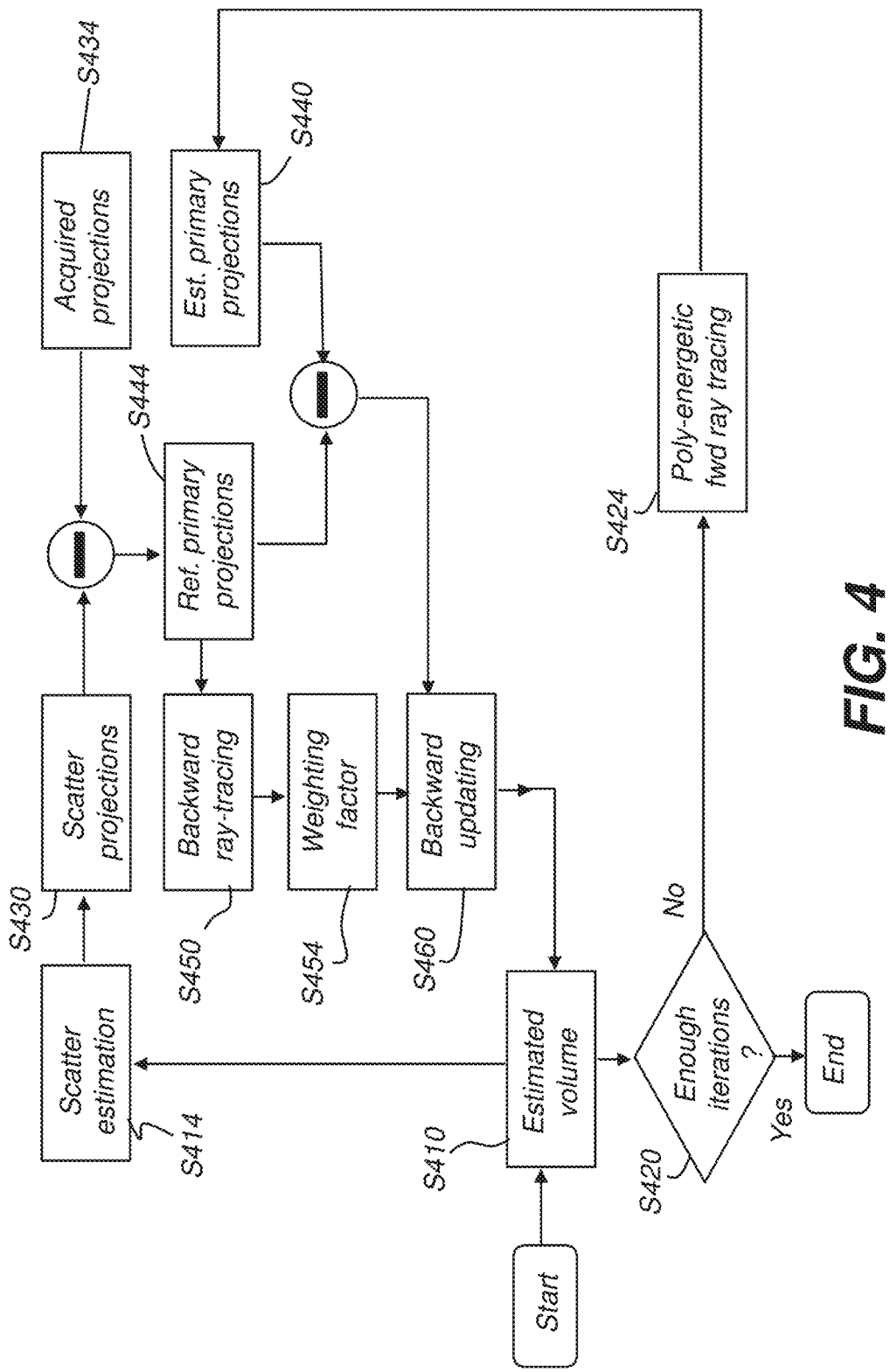
FIG. 4 is a logic flow diagram showing a sequence for reconstruction to reduce metal artifacts.

The logic flow diagram of FIG. 4 shows an iterative sequence for volume reconstruction with reduced metal artifacts.

For a number of the steps shown in FIG. 4, prior information may be used, including one or more of the following factors that help to correct for non-linear energy dependency caused by metal implants:

(i) geometry information;
(ii) energy spectral data;
(iii) material properties of the imaged object;
(iv) exposure distribution for the imaged anatomy; and
(v) detector response.

Referring to the FIG. 4 sequence, a first set of acquired projections S434 is acquired. In a volume estimate step S410, an estimated initial volume is generated. The initial estimated volume can be empty, a zero volume, or a volume reconstructed using conventional reconstruction methods, such as FBP. With each iteration through the processing sequence in FIG. 4, the latest volume estimation that has been generated from step S410 serves as input to a scatter estimation step S414. Scatter estimation step S414 can perform Monte-Carlo estimation or use some other scatter estimation utility to generate scatter distribution data, shown as scatter projections data S430. According to an embodiment of the present disclosure, the scatter projections data S430 can be in the form of projection images, with the computed data from step S430 at angles corresponding to angles of the first set of acquired projection images S434. At least a portion of the prior information described above (items (i)-(v)) can be used to condition or facilitate Monte-Carlo estimation, or other suitable calculation, of the scatter distribution.

A second set of reference primary projections S444 is generated by combination of the first set of acquired projection images S434 and the computed scatter projections data S430. For example, the estimated scatter can be simply subtracted from the set of acquired projections S434.

A forward ray tracing step S424, also utilizing one or more components of the prior information outlined in (i)-(v) above, applies a poly-energetic forward ray-tracing technique, as described subsequently in more detail, to generate a third set of estimated primary projections S440. The second set of reference primary projections S444 that had been formed from scatter distribution data and acquired projection images can be compared with the generated third set of estimated primary projections S440. An error signal corresponding to the difference between members of the second set of reference primary projections S444 and the third set of estimated primary projections S440 is then input to a backward ray-tracing step S450 that is input to a weighting step S454. A weighting factor is then input to a backward updating step S460, along with results from combining the second set of reference primary projections S444 with the third set of estimated primary projections S440. According to an embodiment of the present disclosure, backward updating step S460 uses SART (Simultaneous Algebraic Reconstruction Technique) or pSART (polychromatic SART), with results input for recalculating an estimated volume in step S410. The prior information outlined in (i)-(v) above, also applies to backward updating step S460.

Steps S450, S454, and S460 perform the processing that reconstructs the updated volume image estimate according to comparison between sets of computed and acquired projection images and using the weighting logic of the present disclosure.

Figure 2:
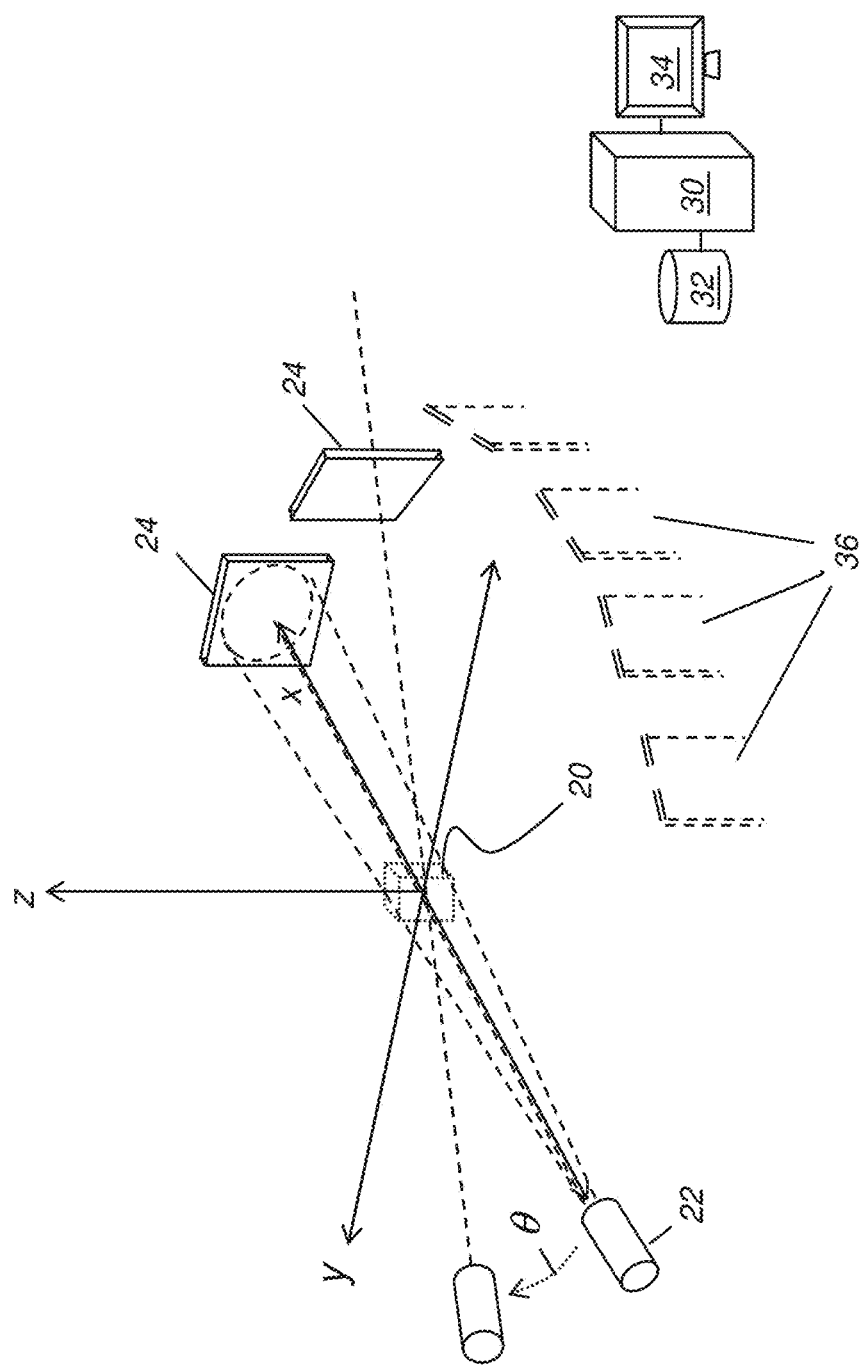
FIG. 2 is a block diagram schematic that shows how CBCT projection images are obtained.

A decision step S420 determines whether sufficient iterations of the process have been executed for terminating the sequence. The updated estimated volume, after sufficient iterations as determined by decision step S420, is then used for rendering one or more images to the display 34 (FIG. 2).

The various sets of projection images described in the sequence of FIG. 4 are generated at the same angles as the initial set of acquired projection images S434. Thus, the respective first, second, and third sets of acquired projection images S434, reference projections S444, and estimated primary projection images S440 have the same cardinality, with all of the projection images in each of the indicated sets taken over the same sequence of angles. Thus, these sets of projection images, whether calculated, synthesized, or acquired, can be considered to be ordered according to corresponding actual or calculated acquisition angle, as described with reference to FIG. 2.

Poly-Energetic Ray Tracing

Figure 5B:
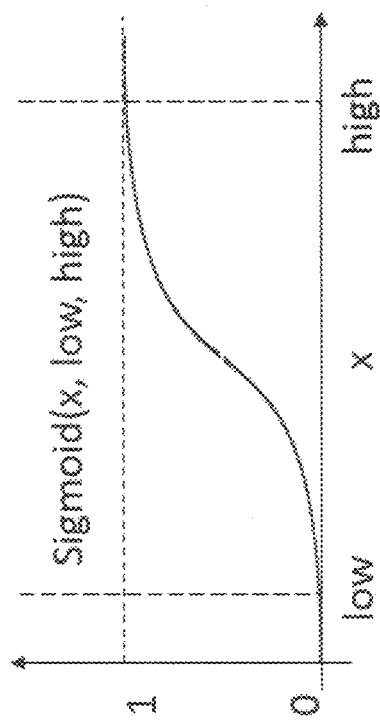
FIGS. 5A and 5B are graphs showing exemplary sigmoid functions.
Figure 5A:
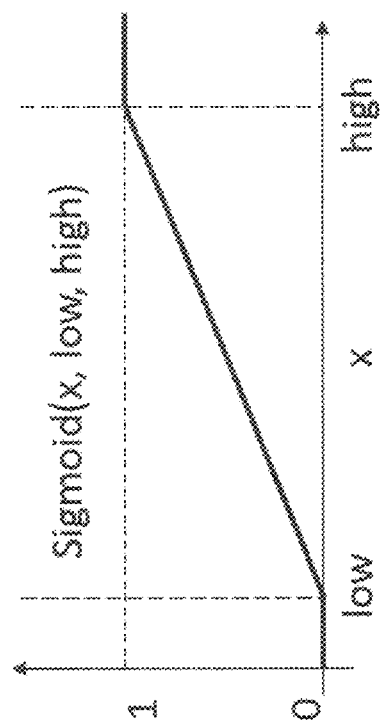

For poly-energetic forward ray tracing in forward ray tracing step S424 of FIG. 4, a signal quality factor $Q_r$ can be defined for each ray path r according to the detected photon number associated with that ray path. The signal quality factor $Q_r$ can be defined as:

$$Q_r = \text{Sigmoid}(N_r, N_{low}, N_{high})$$

wherein $N_r$ is the photon number detected for ray r; values $N_{low}$ and $N_{high}$ are photon number thresholds, minimum and maximum values respectively. Value $Q_r$ is normalized to the range [0,1] based on the detected photon number. Value 0 indicates lowest quality; value 1 indicates high quality. By way of illustration, the graphs of FIGS. 5A and 5B show two different sigmoid functions that can be used for calculation of the signal quality factor. A hyperbolic tangent function (tan h), similar to the sigmoid function, can alternately be used.

It is instructive to consider the impact of poly-energetic factors in the forward projection and ray tracing process of step 424 in FIG. 4. As a first approximation, for a fully monochromatic x-ray signal directed along rays L, the relation between the detected signal Y and the total or original emitted signal $Y_0$, and their relationship to coefficient of attenuation value μ can be expressed as follows:

$$Y = Y_0 e^{-\int \mu dL}$$

So that, for the detected signal along ray L:

$$\ln \frac{Y_0}{Y} = \mu L$$

Considering the broader spectrum of x-ray emission, the signal acquired using the forward projection model for the poly-energetic x-ray beam is more complex and can be given by:

$$\bar{p} = -\ln\left(\int I(\epsilon)\left[e^{-\int L_r \mu(\vec{x},\epsilon) dl}\right] d\epsilon\right)$$

for each ray path ($r = 1, \ldots N_R$)

wherein $\bar{p}$ is the logarithmic estimation along the rth ray line $L_r$;

$I(\epsilon)$ is the spectrum (normalized to unit area);

$\mu(\vec{x},\epsilon)$ the unknown spatial- and energetic-related attenuation map of the imaged object.

Calculation and reconstruction using poly-energetic techniques are described, for example, in the articles by Lin and Samei cited previously. Additional information related to CT image reconstruction using poly-energetic calculation can be found, for example, in a paper by Elbakri and Fessler, entitled "STATISTICAL IMAGE RECONSTRUCTION FOR POLYENERGETIC X-RAY COMPUTED TOMOGRAPHY" in IEEE Trans. Medical Imaging 21(2), February, 2002, incorporated herein in its entirety.

Updating the Estimated Volume

Backward updating step S460 is the reconstruction update process that can execute the following processing for each voxel v:

$$\mu_v^{k+1} = \mu_v^k + \eta_r \sum_r Q_r f(y_r, y_{0r})$$

wherein value $\mu_v^{k+1}$ is the updated attenuation value calculated from the previous (kth) value for voxel v; value $\eta_r$ defines a learning rate for executing interations. The value $\eta_r$ varies between 0.0 and 1.0 and controls the rate of the update. Setting of the $\eta_r$ value can be in proportion to the relative amount of error between elements of the third set of estimated primary projections S440 and elements of the second set of reference primary projections S444.

Function $f$ relates to the reconstruction logic, such as SART, FBP, or other reconstruction algorithm.

Value $y_r$ is the computed signal; value $y_{0r}$ is the initial measured signal.

Rating Projection Signal Quality

An aspect of the present disclosure is determining the relative quality of the ray signal at locations in the projection image on detector 24 and weighting the signal in order to adjust its effect on reconstruction calculations according to the quality rating.

Figure 6A:
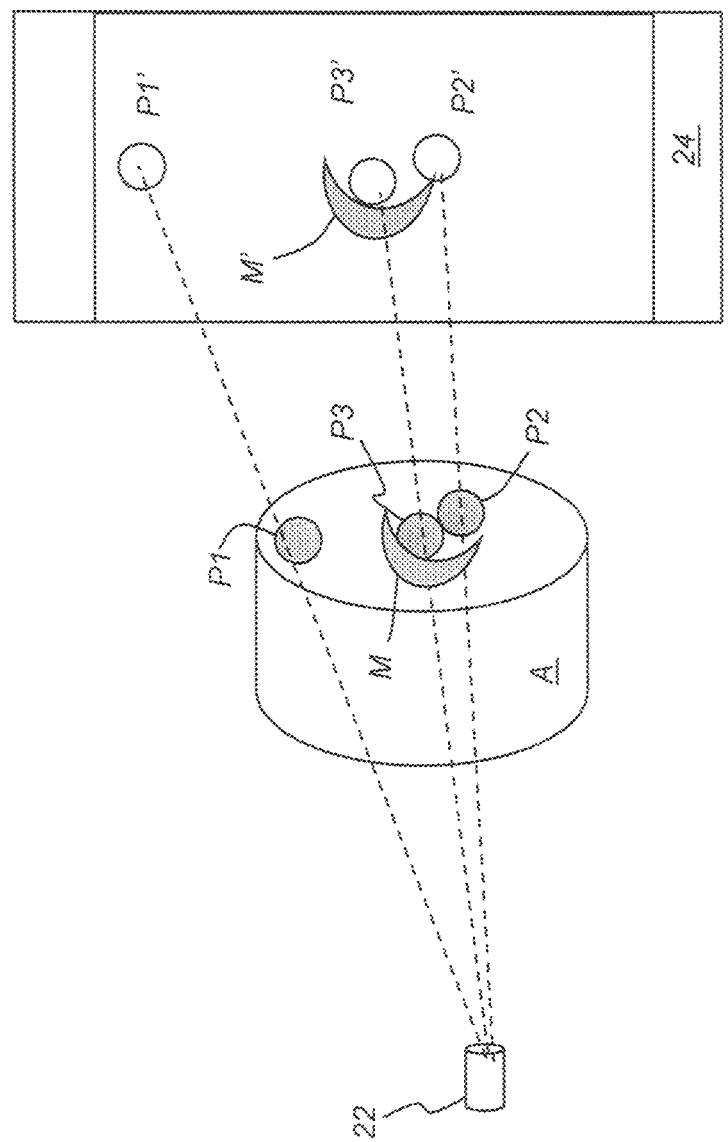
FIGS. 6A and 6B are schematic diagrams that show how projection data can be weighted according to projection angle and location in the object.
Figure 6B:
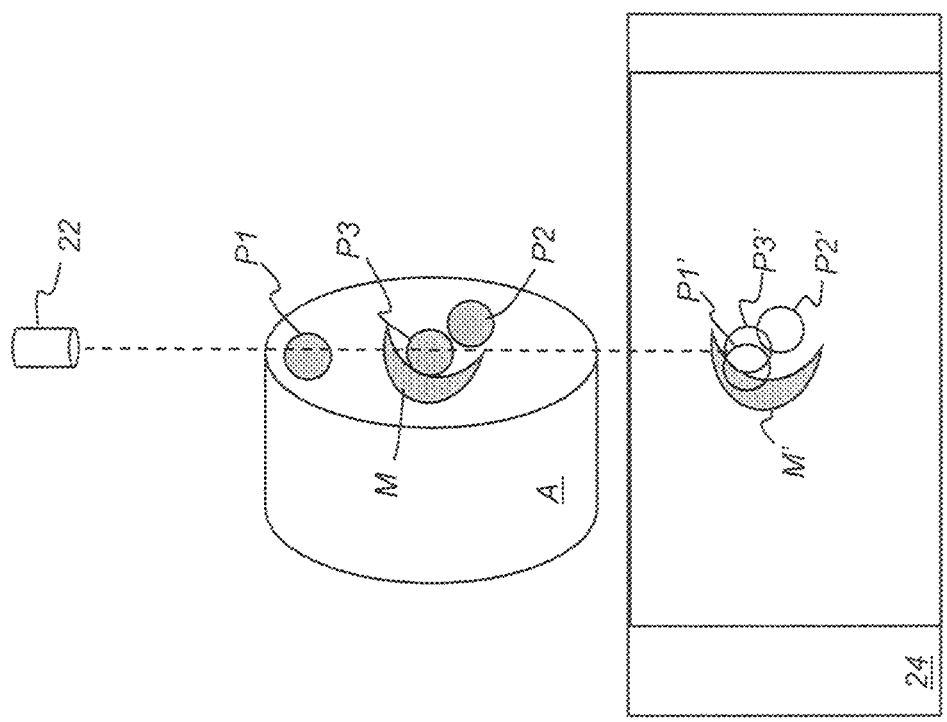

FIGS. 6A and 6B are schematic diagrams that show how projection data can be weighted according to projection angle and location in the object, including position relative to a metal object M, such as an implant. Shown in these figures is the region that lies inside portions that are partially bounded a metal feature, metal object M, relative to the source 22. This type of region has proved to be particularly difficult to reconstruct without metal artifacts. The object anatomy is indicated at A. The positions of source 22 and detector 24 are shown at different angles with respect to the object anatomy. Three reference points P1, P2, and P3 are shown, along with corresponding projection image pixels P1', P2', and P3'. The projection image for the metal object is at M'.

For the image acquisition angle shown at FIG. 6A, the following observations can be made as to signal quality:

(i) For point P1, the projection signal has a high number of photons. The signal quality is good at this angle.

(ii) For point P2, the x-ray passes through a thin edge of the metal. Some number of photons is detected. The signal quality can be considered moderately reliable at this angle.

(iii) For point P3, a large number of photons are absorbed by the metal. The signal quality is therefore considered poor at this angle.

Ratings of good/moderate/poor, or other suitable ratings, can be used to assign weight values for pixels in each projection image. For each location, signal quality can differ depending on the acquisition angle.

The schematic diagram of FIG. 6B shows how signal quality changes for the same points P1, P2, P3 at a different acquisition angle. For the image acquisition angle shown at FIG. 6B, the following observations can be made as to signal quality:

(i) For point P1, the projection signal has a reduced number of photons. The signal quality is considered poor at this angle.

(ii) For point P2, only a few photons are absorbed by thin portions of the metal. The signal quality is considered good at this angle.

(iii). For point P3, the x-ray passes through only a thin edge of the metal. The signal quality can be considered moderately reliable at this angle.

Variable weighting factors can be assigned for each pixel value according to the image analysis described with reference to FIGS. 6A and 6B. An exemplary weighting scheme can use the following weighting values:

| Signal quality | Weight assignment |
| --- | --- |
| Good | 90 |
| Moderately reliable | 50 |
| Poor | 10 |

The assigned weighting value can then be applied for the corresponding pixel at a particular angle. In this way, the same point in space for the imaged subject can be assigned different values, depending on the acquisition angle of each projection image.

The following references are cited:

Yuan Lin and Ehsan Samei, "A FAST POLY-ENERGETIC FBP ALGORITHM", Physics in Medicine and Biology 59 (2014) pp. 1655-1678;

Yuan Lin and Ehsan Samei, "AN EFFICIENT POLYENERGETIC SART (pSART) RECONSTRUCTION ALGORITHM FOR QUANTITIVE MYCARDIAL CT PERFUSION", Medical Physics, 41 (2) February 2014, pp. 021911-1 to 021911-14; and F. Edward Boas and Dominik Fleischmann, "CT ARTIFACTS: CAUSES AND REDUCTION TECHNIQUES", Imaging Med. (2012) 4 (2), 229-240, pp. 1-19;

US 2008/0095302 (Ruhrnschopf) titled "METHOD FOR HARDENING CORRECTION IN MEDICAL IMAGING"; and WO 2016/003957 (Lin) titled "SPECTRAL ESTIMATION AND POLY-ENERGETIC RECONSTRUCTION METHODS AND X-RAY SYSTEMS" published on Jan. 7, 2016.

Consistent with one embodiment, the present disclosure utilizes a computer program with stored instructions that perform on image data accessed from an electronic memory. As can be appreciated by those skilled in the image processing arts, a computer program of an embodiment of the present disclosure can be utilized by a suitable, general-purpose computer system, such as a personal computer or workstation. However, many other types of computer systems can be used to execute the computer program of the present disclosure, including networked processors. The computer program for performing the method of the present disclosure may be stored in a computer readable storage medium. This medium may comprise, for example; magnetic storage media such as a magnetic disk such as a hard drive or removable device or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present disclosure may also be stored on computer readable storage medium that is connected to the image processor by way of the internet or other communication medium. Those skilled in the art will readily recognize that the equivalent of such a computer program product may also be constructed in hardware.

It should be noted that the term "memory", equivalent to "computer-accessible memory" in the context of the present disclosure, can refer to any type of temporary or more enduring data storage workspace used for storing and operating upon image data and accessible to a computer system, including a database. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Displaying an image requires memory storage. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It will be understood that the computer program product of the present disclosure may make use of various image manipulation algorithms and processes that are well known. It will be further understood that the computer program product embodiment of the present disclosure may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present disclosure, are not specifically shown or described herein and may be selected from such algorithms, systems, hardware, components and elements known in the art.

The disclosure has been described in detail with particular reference to a presently preferred embodiment, but it will be understood that variations and modifications can be effected within the spirit and scope of the disclosure. The presently disclosed embodiments are therefore considered in all respects to be illustrative and not restrictive. The scope of the disclosure is indicated by the appended claims, and all changes that come within the meaning and range of equivalents thereof are intended to be embraced therein.

What is claimed is:

1. A method for reducing metal artifacts in a volume radiographic image, the method executed at least in part on a computer, comprising:
   acquiring a first set of a plurality of projection images of an object captured on a radiographic detector at different acquisition angles;
   generating an estimate of a volume that includes the object using the acquired projection images;
   updating the estimated volume by executing one or more iterations of:
   (i) generating a second set of a plurality of scatter-corrected projection images using the acquired first set of projection images and a scatter distribution calculated for the estimated volume;
   (ii) generating a third set of a plurality of estimated projection images using forward ray-tracing through the estimated volume; and
   (iii) reconstructing the estimated volume according to a signal quality factor obtained from analysis of a detector signal and used in a comparison of the second set of scatter-corrected projection images with the third set of estimated projection images; and
   displaying, storing, or transmitting one or more images rendered from the updated estimated volume.

2. The method of claim 1 wherein the forward ray-tracing applies poly-energetic ray-tracing.

3. The method of claim 2 wherein the signal quality factor is obtained by a calculation using a weighting that corresponds to a sigmoid function or tan h function.

4. The method of claim 1 wherein the signal quality factor is obtained using acquired photon data for each voxel of the second set of scatter-corrected projection images.

5. The method of claim 1 wherein generating the estimate of the volume comprises forming an empty volume.

6. The method of claim 1 wherein generating the estimate of the volume comprises using an atlas or other standard volume representation for the imaged anatomy.

7. The method of claim 1 wherein updating the estimated volume comprises reconstructing the estimated volume using filtered back projection.

8. The method of claim 1 wherein updating the estimated volume comprises reconstructing the estimated volume using a simultaneous algebraic reconstruction technique reconstruction.

9. The method of claim 1 wherein generating the second set of scatter-corrected projection images further comprises subtracting scatter projection image data from the set of acquired projection images.

10. The method of claim 1 further comprising using a predetermined number of iterations for updating the estimated volume.

11. A method for reducing metal artifacts in a volume radiographic image, the method executed at least in part on a computer, comprising:
   acquiring a first set of a plurality of projection images of an object captured on a radiographic detector at different acquisition angles;
   using the first set of projection images, generating an estimate of the volume that includes the object;
   updating the estimated volume by executing one or more iterations of:
   (i) generating a second set of a plurality of scatter-corrected projection images using the acquired first set of projection images and a scatter distribution calculated for the estimated volume;
   (ii) generating a third set of a plurality of estimated projection images using poly-energetic forward ray-tracing through the estimated volume at angles corresponding to the acquisition angles of the first set of projection images;
   (iii) reconstructing the estimated volume according to a signal quality factor based on acquired photon data for each voxel of the second set of scatter-corrected projection images and used in a comparison of the second set of scatter-corrected projection images with the third set of estimated projection images; and
   displaying, storing, or transmitting one or more images rendered from the updated estimated volume.

12. An apparatus for generating a volume radiographic image of a subject, comprising:
- an x-ray source and digital radiographic detector configured to acquire a first set having a plurality of projection images of the subject at different acquisition angles;
- a computer processor programmed to:
  - (a) generate an estimate of the volume that includes the object using the first set of acquired projection images;
  - (b) update the estimated volume by executing one or more iterations of:
    - (i) generating a second set of scatter-corrected projection images using the acquired first set of projection images and a scatter distribution provided for the estimated volume;
    - (ii) generating a third set of estimated projection images using forward ray-tracing through the estimated volume; and
    - (iii) reconstructing the estimated volume according to a signal quality factor obtained from analysis of a detector signal and used in a comparison of the second set of scatter-corrected projection images with the third set of estimated projection images; and
- a display, in signal communication with the computer processor, to display one or more images rendered from the updated estimated volume.

* * * * *

UNITED STATES PATENT AND TRADEMARK OFFICE
CERTIFICATE OF CORRECTION

PATENT NO. : 10,552,992 B2
APPLICATION NO. : 15/964835
DATED : February 4, 2020
INVENTOR(S) : Yuan Lin et al.

It is certified that error appears in the above-identified patent and that said Letters Patent is hereby corrected as shown below:

In the Specification

Column 4, Line 12 — Please replace "attenuation integrals at the r-th ray path from the X-ray" with -- attenuation integrals at the *r-th* ray path from the X-ray --

Column 4, Line 17 — Please replace "voxels along the r-th X-ray path during the backward" with -- voxels along the *r-th* X-ray path during the backward --

Column 8, Line 26 — Please replace "is the photon number detected for ray r;" with -- is the photon number detected for ray *r*; --

Column 8, Lines 63-64 — Please replace "wherein $\bar{p}$ is the logarithmic estimation along the rth ray line $L_r$;" with -- wherein $\bar{p}$ is the logarithmic estimation along the *r*th ray line $L_r$; --

Column 8, Line 66 — Please replace "$\mu(\vec{x},\varepsilon)$ the unknown spatial- and energetic related" with -- $\mu(\vec{x},\epsilon)$ is the unknown spatial- and energetic-related --

Signed and Sealed this
Eighth Day of September, 2020

Andrei Iancu
*Director of the United States Patent and Trademark Office*